United States Patent
Bhattacharya et al.

(10) Patent No.: US 6,353,610 B1
(45) Date of Patent: Mar. 5, 2002

(54) METHOD AND SYSTEM FOR CALL SIGNALING IN TELEPHONE CALLS OVER A PACKET-SWITCHED NETWORK

(75) Inventors: Saswata Bhattacharya, Sayreville; Mahendra Pratap, Cliffwood Beach; Harvey S. Schultz, Manalapan; Tript P. Singh, Tinton Falls; Quan Li, Edison, all of NJ (US); Ghassan Z. Qadah, Westbank (IL); Gregory J. D'Angelo, Branchburg, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/100,627

(22) Filed: Jun. 19, 1998

(51) Int. Cl.⁷ .............................................. H04L 12/66
(52) U.S. Cl. .................... 370/352; 370/353; 370/355
(58) Field of Search ............................... 370/352, 353, 370/355, 356, 389, 380, 392, 401, 404, 427, 435, 465

(56) References Cited

U.S. PATENT DOCUMENTS 5,351,237 A    9/1994  Shinohara et al.
6,069,890 A *  5/2000  White et al. ................. 370/352
6,141,545 A * 10/2000  Begeja et al. ................ 455/417

* cited by examiner

Primary Examiner—Wellington Chin
Assistant Examiner—Brenda H. Pham
(74) Attorney, Agent, or Firm—Duane, Morris & Heckscher LLP

(57) ABSTRACT

A telephone call from first telephone device to a second telephone device is initiated by a call directly from the first telephone device to a first gateway. The first gateway receives dialed digits from the second telephone device, identifies an address on a packet switched network of a second gateway associated with the second telephone device, which identified by the dialed digits. The first gateway contacts the second gateway via the packet-switched network. The second gateway initiates a circuit-switched telephone connection to the second telephone device. When a ringing signal or busy signal is received from the second telephone device by the second gateway, the second gateway provides a signal via the packet-switched network to the first gateway. The first gateway provides the corresponding signal to the first telephone device.

15 Claims, 4 Drawing Sheets

METHOD AND SYSTEM FOR CALL SIGNALING IN TELEPHONE CALLS OVER A PACKET-SWITCHED NETWORK

FIELD OF THE INVENTION

This invention relates to providing for telephone calls over packet-switched networks, such as the Internet, and in particular to call signaling for such telephone calls.

BACKGROUND OF THE INVENTION

Conventionally, telephone calls, including voice calls, fax transmissions, and data transmissions between computers, are carried over circuit switched telephone networks. Circuit switched telephone networks provide a very reliable switched path between endpoints. However, the cost of telephone calls over circuit switched telephone networks over more than short distances, particularly long-distance and international calling, is very significant.

One solution that has been proposed is providing telephone connections via packet-switched networks, such as the Internet. In packet-switched networks, messages are broken into individual packets, which are separately transmitted over the network to a destination. Alternative pricing schemes are available in such networks.

In existing techniques for telephony over packet-switched networks, a telephone user must take certain steps that render using such networks less desirable than circuit switched telephone networks. For example, a user must employ a personal computer with a connection to the Internet rather than a conventional telephone. Alternatively, a user must complete a conventional local telephone call to a server, and then input the destination telephone number to complete the call. Either of these processes represent significant inconvenience for the user. Also, fax machines, which are specifically designed to complete calls directly over a public switched telephone network (PSTN) must be individually reprogrammed, or may not be programmable to take advantage of these techniques.

SUMMARY OF THE INVENTION

In a method according to the invention, a telephone call from a first telephone device to a second telephone device is carried out via a packet-switched network with call signaling identical to that obtained in a telephone call via a circuit-switched network. A telephone call is initiated from a telephone device which is connected To a first gateway. The first gateway receives dialed digits from the telephone device, and identifies an address on a packet switched network of a second gateway associated with a receiving telephone device identified by the dialed digits. The first gateway contacts the second gateway via the packet-switched network. The second gateway initiates a circuit-switched telephone connection to the receiving telephone device. When a ringing signal or busy signal is received from the receiving telephone device by the second gateway, the second gateway provides a signal via the packet-switched network to the first gateway. The first gateway provides the corresponding signal to the initiating telephone device. The method is thereby transparent to the user of the initiating telephone device.

In a method according to the invention, a telephone call from a first telephone device is facilitated over a packet-switched network. A telephone call is received at a first gateway. The first gateway receives dialed digits, identifies an address on a packet-switched network of a second gateway associated with a receiving telephone device identified by the dialed digits. The first gateway sends a signal on the packet-switched network to the second gateway. When the first gateway receives a signal over the packet-switched network indicating that the second gateway is receiving a ringing signal or busy signal from a receiving telephone device, the first gateway provides the corresponding signal to the initiating telephone device.

In a system according to the invention, a first gateway server is connected to a first telephone device and to a packet-switched network. The first gateway server is configured to detect a telephone call from the first telephone device, to identify an address on a packet-switched network of a second gateway associated with a receiving telephone device identified by the first telephone device, to send a signal on the packet-switched network to the second gateway requesting a telephone connection to the receiving telephone device, and, on receiving a signal over packet-switched network indicating that the second gateway is receiving a ringing signal or a busy signal from a receiving telephone device, providing a corresponding signal to the first telephone device.

DETAILED DESCRIPTION OF A PREFERRED EMBODIMENT

Figure 1:
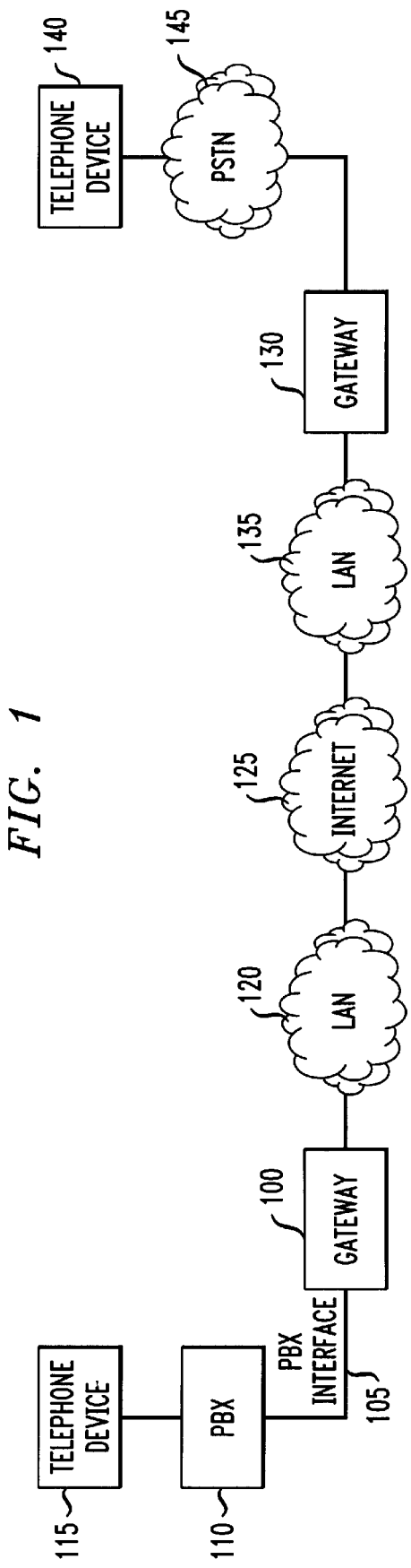
FIG. 1 is a block diagram of a system including the invention in an illustrative operational environment.

Referring now to FIG. 1, there is shown a schematic diagram showing an overall system according to the invention in its environment. There is shown a first gateway, or Internet telephony server 100. Connected to first gateway 100 via PBX interface 105 and private branch exchange (PBX) 110 is a telephone device 115. PBX interface 110 may include any suitable telephone line, including T1, ISDN PRI, E1, or ISDN EPRI. First gateway 100 is also connected to a packet switched network, such as the Internet 125, via LAN 120. Second gateway 130 is also connected to the Internet via second LAN 135. Second gateway 130 is capable of communicating with second telephone device 140 via public switched telephone network (PSTN) 145. Telephone devices 115 and 140 may be any suitable devices that communicate over telephone lines, including voice telephones, fax machines, or modems.

Figure 2:
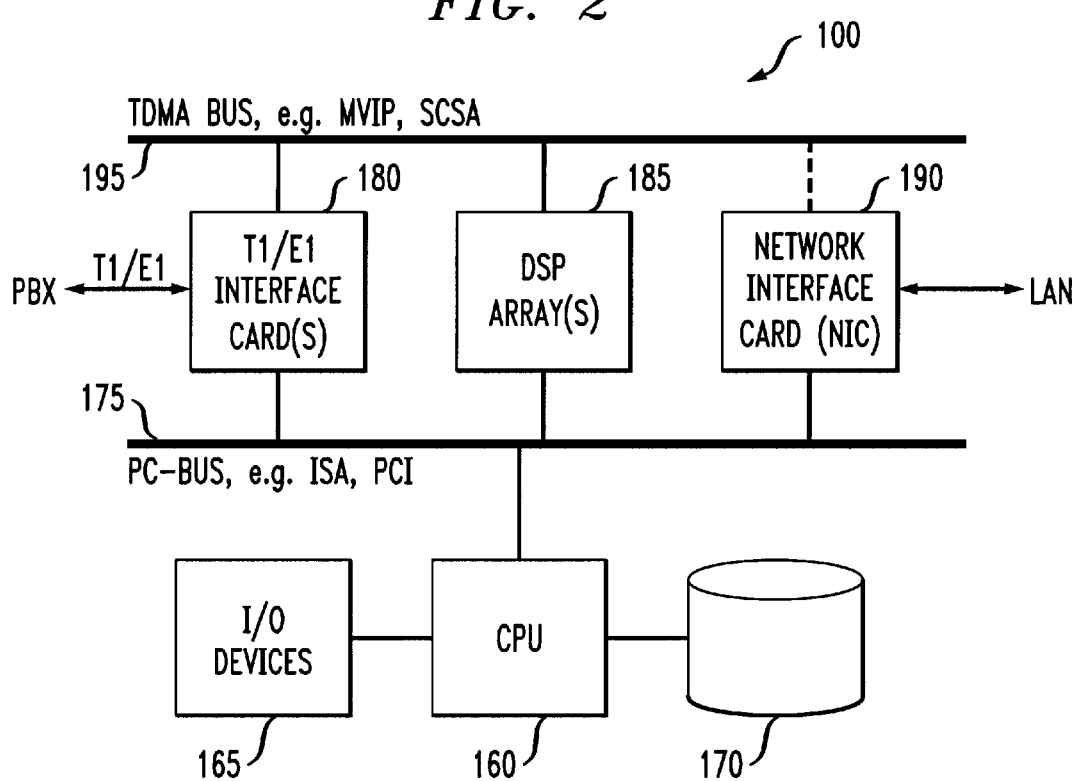
FIG. 2 is a block diagram of a server in accordance with the invention.

Referring now to FIG. 2, there is shown a schematic diagram of a Internet telephony server 100. Server 100 includes central processing unit (CPU) 160. CPU 160 may be based on a suitable microprocessor, such as the Pentium (R) chip from Intel. Central processing unit 160 communicates in a conventional manner with input and output devices 165, such as monitor, keyboard, and mouse, and storage devices 170. CPU 160 is also coupled to a PC-bus 175. PC bus 175 is coupled to telephone interface cards 180, digital signal processor arrays 185, and network interface card 190. Telephone interface cards 180 are coupled via a suitable line to PBX 110. Network interface card 190 is coupled to LAN 120. A second bus 195, which may be, for example, a TDMA bus, such as a MVIP or SCSA bus, is also provided for transporting voice data between the telephone interface cards 180 and DSP array 185. The system may optionally be configured with NIC 190 coupled to TDMA bus 195. This permits voice data to be exchanged between DSP arrays 185 and NIC cards 190.

Figure 3:
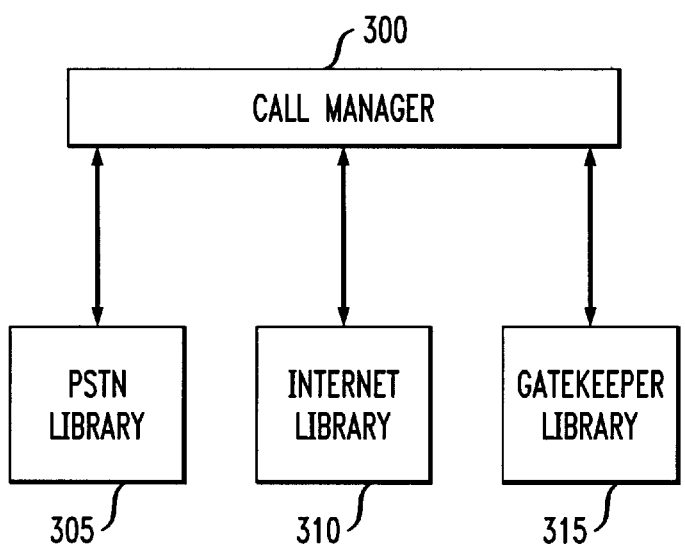
FIG. 3 is a block diagram showing software components in a system according to the invention.

Referring now to FIG. 3, there are shown the major software components of Internet telephony server (ITS) 100 that are involved in call processing functions. The call manager 300 performs overall supervision of a call between the public switched telephone network (PSTN) and the Internet. Call manager interacts with a number of dynamic link libraries in performing this task. Other components are the PSTN library 305, the Internet Library 310, and the gatekeeper library 315. These components are known collectively as call processing components. Each of these components operates through lower level software in well-known manners. Additional components, known generally as infrastructure components, include an activity/trace recorder, a configurator, a database library, and a timer. The infrastructure components are not shown. The functions of the call processing components will be explained with reference to an exemplary call sequence.

Figure 4:
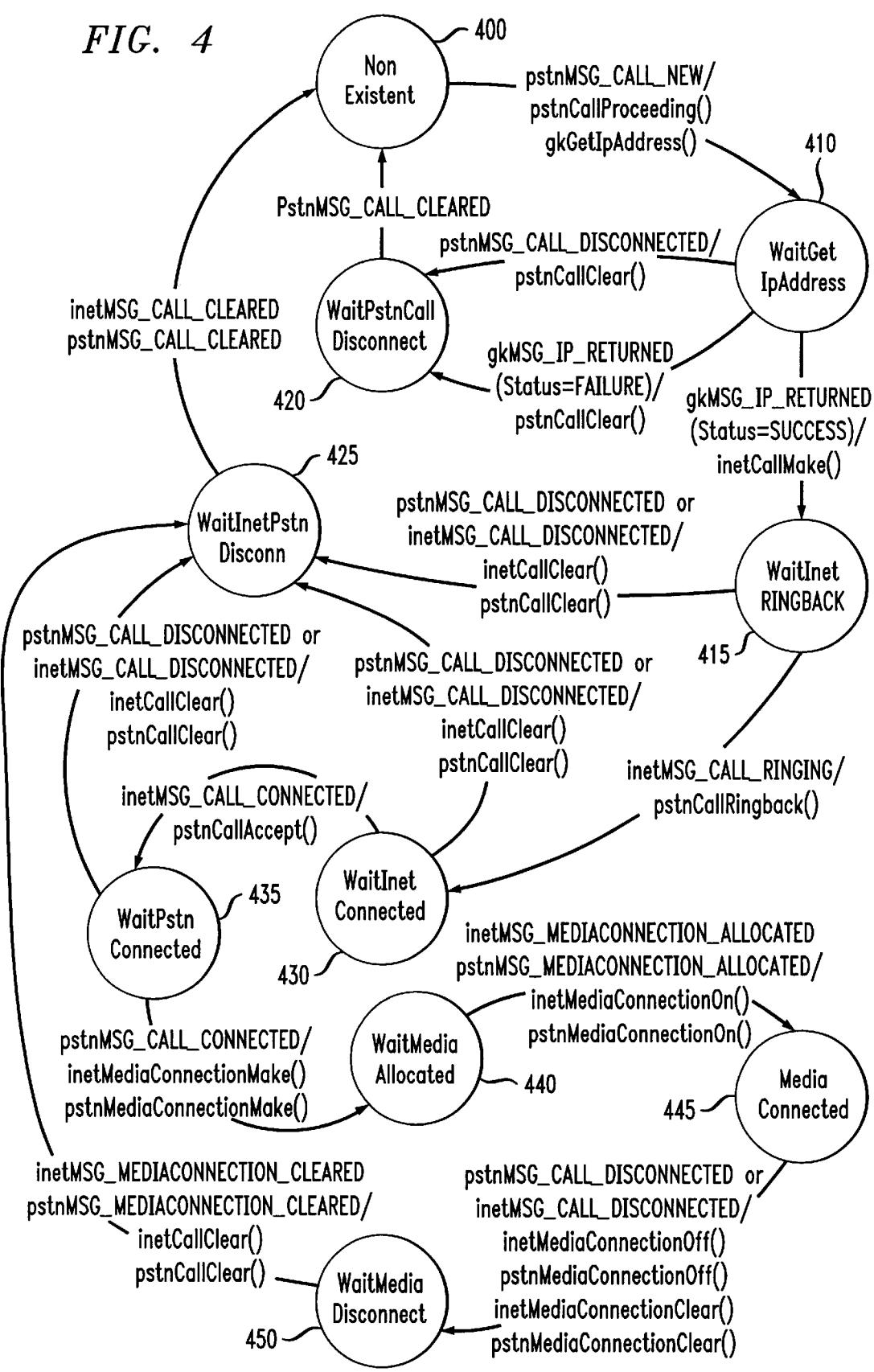
FIG. 4 is a flow chart illustrating the operation of a system according to the invention.

Referring now to FIG. 4, there is illustrated the operation of the system upon receipt of a call. Preliminarily, it should be noted that the call originates from telephone device 115 and is directed by PBX 110 over PBX interface 105 directly to gateway 100. As telephone device 105 is connected to gateway 100 through a private branch exchange, no additional digits need be dialed by telephone device 105. Initially, the call is non-existent, as shown by block 400. Upon receipt of a call, pstn library 305 generates message pstnMSG_CALL_NEW to call manager 300. This message is generated upon collection of the dialed digits. The dialed digits include, at a minimum, the number corresponding to the destination telephone number, i. e., the number identifying second telephone device 140 of FIG. 1. Dialed digits may include, in addition to the destination telephone number, bill back information or security codes. The function pstnCallProceeding is called by call manager 300 from pstn library 305 in response to the new call message to communicate the handle given to the new call by the application. The handle is a unique identifier given to the new call. Call manager also calls to gatekeeper library 315 to get an Internet protocol address of a corresponding server for the destination telephone number. There is a state of waiting for getting an IP address, indicated by block 410. Gatekeeper library 315 communicates to call manager the message gkMSG_IP_RETURNED. This message includes fields to indicate the success or failure of processing the command to identify the Internet protocol address.

If the Internet protocol address is identified, the call manager calls the function inetCall Make from the Internet library 310. This causes a suitable message to indicate the initiation of a call to be sent over network interface card over the Internet and addressed to the identified gateway. This initial message may include an identification of the telephone number of the originating telephone device 115. This identification may be included as caller identification information in the telephone call made by second gateway 130 to second telephone device 140. There is then a state of waiting for a ringback signal from the Internet. This is indicated by box 415.

If the message from the gatekeeper library was that there was the attempt to identify the Internet protocol address was a failure, then call manager 300 calls the function pstnCallClear from the PSTN Library 305. This function tears down the call. The system then is in the state of waiting for disconnect, shown by box 420. When the message pstnMSG_CALL_CLEARED is received from the pstn library 305, the call is non-existent, as indicated by the arrow leading to box 400 from box 420. Similarly, if the call is disconnected, such as by telephone device 115 going on hook, pstn library 305 generates the message pstnMSG_CALL_DISCONNECTED to call manager 300. Call manager 300 then calls the function pstnCallClear. The call state then proceeds to block 420.

Figure 5:
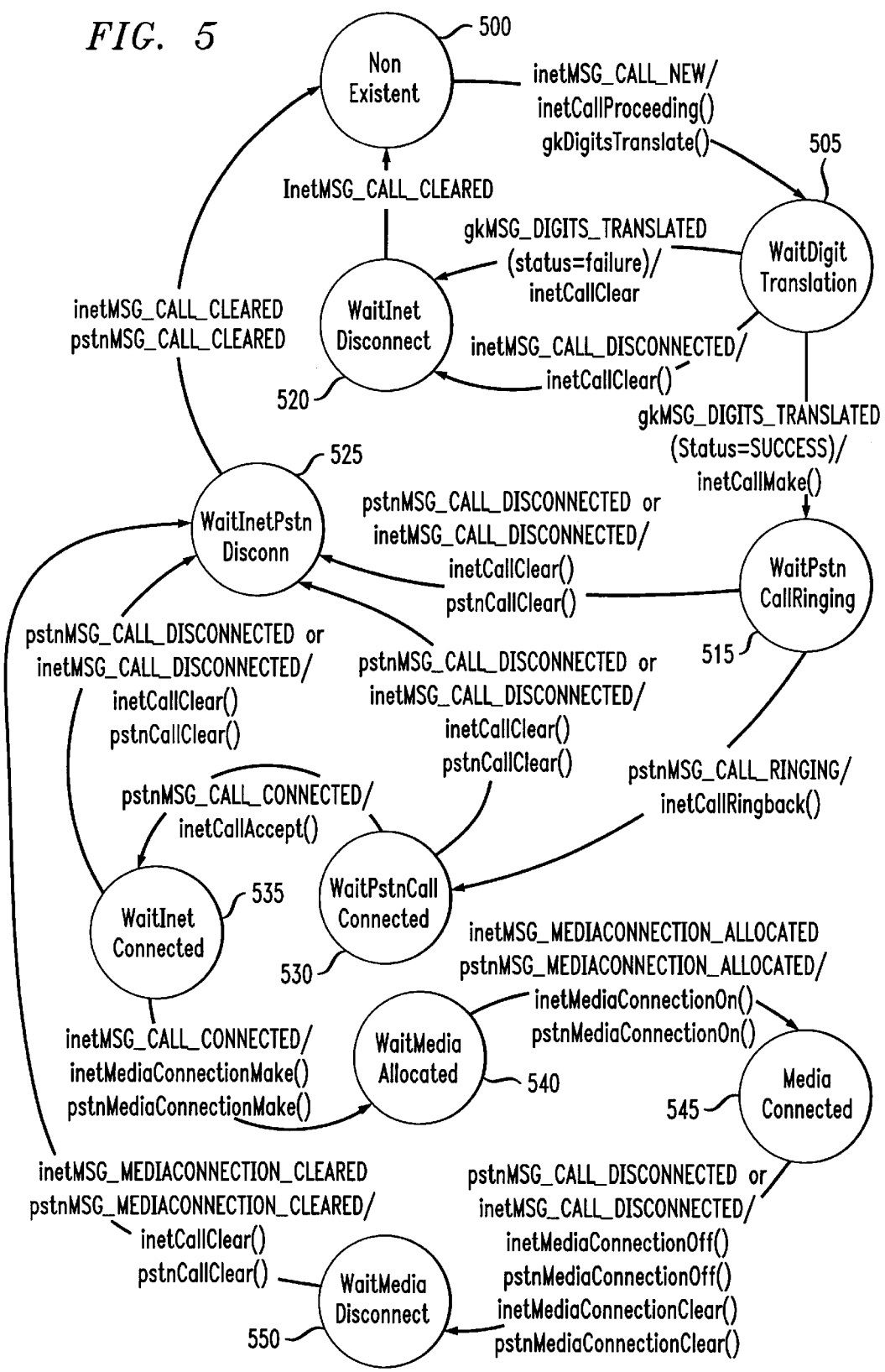
FIG. 5 is a flow chart illustrating another aspect of the operation of the system according to the invention.

Referring to FIG. 5, there is shown a diagram depicting the steps in call setup and tear down at the receiving server, i.e., in FIG. 1, second gateway 130. Box 500 designates that there is no call at present. When the message is received over the Internet that it is desired to create a call, the Internet library provides the message inetMSG_CALL_NEW to the call manager. The call control service inetCallProceeding is called by call manager to communicate the handle given to the new call. Call manager then directs the gatekeeper library to translate the dialed digits. The dialed digits may need to be translated to identify, for example, whether the server needs to initiate a call over the PSTN or to a connected PBX. The next state is waiting for the gatekeeper library to complete digit translation, as indicated by box 505.

The gatekeeper library indicates its results by providing a message gkMSG_DIGITS_TRANSLATED to call manager. If the status is successful, call manager calls the function pstnCallMake from the PSTN library. The receiving server, or second gateway, 130, then initiates a call over the public-switched telephone network. Of course, if second gateway 130 is coupled directly to a private branch exchange, the call could be directed to a telephone device coupled to that private branch exchange. The next state is waiting for call ringing on the call, as indicated by block 510.

When ringing on the public-switched telephone network line is detected, the PSTN library generates the message psntMSG_CALL_RINGING. Call manager at second gateway 130 calls inetCallRingback to cause second gateway 130 to transmit a message over the Internet to notify first gateway 100 that ringing has commenced.

When the message that ringing has commenced is received by first gateway 100, Internet library generates the message inetMSG_CALL_RINGING. Call manager then calls psntCallRingback. This results in a ringing signal being provided to first telephone device 115. Thus, a human telephone user, or a device such as a fax machine, perceives a ringing sound on the line simultaneously with the ringing signal on the line when second telephone device 140 is on hook. Alternatively, if second gateway 130 detects a busy signal, second gateway 130 can generate a suitable Internet message to communicate to first gateway 100 the existence of the busy signal. A suitable message is then generated by the Internet library of first gateway 100, and a function can be called to provide a busy signal to first telephone device 115. The busy signal provided by first gateway 100 may be the busy signal appropriate for the telephone network at the location of first gateway 100, even if the busy signal received by second gateway 130 is a different busy signal.

The first gateway 100 then proceeds to the state of waiting for connection of the Internet line, as indicated by block 430. Simultaneously, second gateway 130 is in the state of waiting for the pstn call to be connected, as indicated by block 520. When second gateway 130 detects that receiving telephone device has gone off-hook, the message pstnMSG_CALL_CONNECTED is generated by the pstn library to call manager. Call manager then calls the function inetCallAccept. This causes an Internet message to be sent to the first gateway 100 indicating that the receiving telephone has gone off-hook. On receipt of this Internet message, at first gateway 100, Internet library generates the message inetMSG_CALL_CONNECTED. Call manager calls function pstnCallAccept. First gateway 100 then proceeds to the state of waiting to confirm the connection to the originating telephone device 110, as indicated by block 435. When the message psntMSG_CALL_CONNECTED is received by call manager, the confirmation has been made. Call manager calls the function pstnMediaConnectionMake. This creates a media connection on the pstn side, so that the flow of data can commence. Call manager also calls the function inetMediaConnectionMake. This function creates a media connection on the Internet side of the server, so that the flow of data can commence. The call then proceeds to the state of waiting for confirmation that media have been allocated for the call, as indicated by block 440. On the receiving server, the Internet library, having successfully completed a connection in response to the inetCallMake function of the originating server, sends the message inetMSG_CALL_CONNECTED to the call manager. Call manager calls the functions inetMediaConnectionMake and pstnMediaConnectionMake. This creates the appropriate media connections. Both servers are then in the state of waiting for media to be allocated, as indicated by blocks 440 and 540. When the media resources have been allocated, the pstn media library provides a message pstnMSG_MEDIACONNECTION_ALLOCATED. This message includes a field for indicating the success or failure of the operation. Similarly, the Internet media library provides a message inetMSG_MEDIACONNECTION_ALLOCATED. This process occurs for both gateways 100 and 130. At this point, if all media connection allocations are successful, communication commences. The call at both gateways is in the state "Media Connected", as indicated by blocks 445 and 545.

In addition, call manager will call a function to include in the telephone connection to second telephone device 145 caller identification information in a format suitable for detection by a device at second telephone device 145 for display of caller identification information.

It will readily be understood that the connection process is transparent to the human user or fax machine or other telephone device. Digits are dialed, and the user waits while an attempt is made to sent a message to the receiving server to initiate a pstn call to the receiving telephone device. When either a ringing or a busy signal is detected, the corresponding signal is generated for the user at that end. When a connection is made, the call is completed by appropriate packetizing and depacketizing at the two gateways. Fax signals are modulated and demodulated in an appropriate manner. It should also be noted that, for any message transmitted over the packet-switched network, redundant packets are desirably sent to assure completion, and reduce the risk of not achieving or losing a connection because of the loss or delay in transmission of a particular packet over the packet-switched network.

The call tear down process commences when either first telephone device 115 or second telephone device 140 goes on-hook. This event is detected and results in the PSTN library at the proper gateway sending the message pstnMSG_CALL-DISCONNECTED to the call manager. Call manager then calls functions to end the media connections. These functions are designated as inetMediaConnectionOff, pstnMediaConnectionOff, inetMediaConnectionClear, and pstnMediaConnectionClear. The Internet library transmits a suitable message to the other server, which then produces the message inetMSG_CALL_DISCONNECTED to call manager. Call manager then calls the functions indicated to end the media connections at the other gateway, if the message pstnMSG_CALL_DISCONNECTED was not previously received. The calls then proceed to the state of waiting for media to disconnect, as indicated by blocks 450 and 550. Upon receipt of the message from the Internet library inetMSG_MEDIA CONNECTION_CLEARED, indicating that the media connection is cleared and available, call manager calls the function inetCallClear. Upon receipt of the message from the PSTN library pstnMSG_MEDIACONNECTION_CLEARED, call manager calls the function pstnCallClear. The call then proceeds to the state of waiting for Internet and PSTN disconnect, as indicated by blocks 425 and 525. It will be understood that if either telephone device 115, 140, goes on-hook, or an Internet connection is lost, that the appropriate message, pstnMSG_CALL_DISCONNECTED or inetMSG_CALL_DISCONNECTED will be generated and received by the call managers, in any state after waiting for Internet ringback (415) on the originating server 100, or waiting for PSTN ringing (515) on the receiving gateway server 130. This will result in call manager calling the functions inetCallClear and pstnCallClear, and the call proceeding to the state of waiting for Internet and PSTN disconnect. When the messages inetMSG_CALL_CLEARED and pstnMSG_CALL_CLEARED are received, the call is terminated. When the call is terminated, on second gateway 130, before that point, either because the gatekeeper library was unable to translate the digits, or because the Internet library generates the message inetMSG_CALL_DISCONNECTED, call manager calls the function inetCallClear, and the call goes to the state of waiting for Internet disconnection, as shown by block 520. When the message inetMSG_CALL_CLEARED is received, the call is terminated.

It will be appreciated that ITS 130 can initiate calls through ITS 100. In that case, the call states illustrated in FIG. 4 apply to ITS 130, and the call states illustrated in FIG. 5 apply to ITS 100.

It will be understood that various changes in the details, materials and arrangements of the methods and systems which have been described and illustrated above in order to explain the nature of this invention may be made by those skilled in the art without departing from the principle and scope of the invention as recited in the following claims. Without limiting the foregoing, computer software may be stored on any type of storage medium, and methods described as carried out in software running on general-purpose computer hardware may be implemented in hardware.

What is claimed is:

1. A method of call signaling in processing telephone calls from a first telephone device to a second telephone device over a packet switched network, comprising the steps of:
  (a) receiving at a first gateway from the first telephone device over a telephone line a signal identifying a receiving telephone number associated with the second telephone device;
  (b) identifying an address on the packet switched network associated with a receiving gateway corresponding to said receiving telephone number;
  (c) sending a message via the packet switched network to the receiving gateway;

(d) initiating from said receiving gateway a call via a telephone line to said second telephone device; and (e) when a ringing signal is received by said receiving gateway, providing to said first telephone device a ringing signal.

2. The method of claim 1, wherein said step of identifying an address comprises looking up in a library a unique address corresponding to said receiving telephone number.

3. The method of claim 1, wherein, if a busy signal is received at the receiving gateway when a telephone connection is initiated to the second telephone device, a telephone busy signal is provided by the first gateway to the first telephone device.

4. The method of claim 1, wherein the packet switched network is the Internet.

5. A method of call signaling in processing telephone calls from a first telephone device to a second telephone device over a packet switched network, comprising the steps of:

(a) receiving at a first gateway from the first telephone device over a telephone line a signal identifying a receiving telephone number associated with the second telephone device;

(b) identifying an address on the packet protocol network associated with a receiving gateway corresponding to said receiving telephone number; and (c) when a signal is received by the first gateway from said receiving gateway, indicating that a telephone call has been initiated from said receiving gateway to said second telephone device via a switched telephone network, and that a ringing signal has been received by said receiving gateway, providing to said first telephone device a ringing signal.

6. The method of claim 5, wherein said step of identifying an address comprises looking up in a library a unique address corresponding to said receiving telephone number.

7. The method of claim 5, wherein, if said first gateway receives a signal indicating that a busy signal has been received at the receiving gateway when a telephone connection is initiated to the second telephone device, a telephone busy signal is provided by the first gateway to the first telephone device.

8. The method of claim 5, wherein the packet switched network is the Internet.

9. A storage medium having stored therein a plurality of instructions, wherein the plurality of instructions, when executed by a processor, cause the processor to perform the steps of:

receiving from the first telephone device over a telephone line a signal identifying a receiving telephone number associated with a second telephone device;

identifying an address on a packet protocol network associated with a receiving gateway corresponding to said receiving telephone number;

receiving a signal from said receiving gateway indicating that a telephone call has been initiated from said receiving gateway to said second telephone device via a switched telephone network, and that a ringing signal has been received by said receiving gateway; and providing, upon receipt of said signal from said receiving gateway, a ringing signal to said first telephone device.

10. The storage medium of claim 9, wherein said step of identifying an address comprises looking up in a library a unique address corresponding to said receiving telephone number.

11. The storage medium of claim 5, wherein, if said processor receives a signal indicating that a busy signal has been received at the receiving gateway when a telephone connection is initiated to the second telephone device, a telephone busy signal is provided to the first telephone device.

12. A system for call signaling in processing telephone calls from a first telephone device to a second telephone device over a packet switched network, comprising a first gateway and a second gateway, said first gateway being adapted to: receive from the first telephone device over a telephone line a signal identifying a receiving telephone number associated with the second telephone device, to identify an address on the packet protocol network associated with a receiving gateway corresponding to said receiving telephone number; to send a message via the packet protocol network to the receiving gateway; to receive from the packet protocol network a message indicating that a ringing signal has been received by the receiving gateway when initiating a telephone call over a switched telephone network to the second telephone device, and, in response to said signal from the receiving gateway, to provide a ringing signal to the first telephone device;

said second gateway being adapted to, upon receiving a signal from the first gateway requesting a telephone connection to the second telephone device, initiate via a switched telephone network a call to said second telephone device; and, when a ringing signal is received by said receiving gateway, to provide a signal via the packet-switched network to the first gateway so indicating.

13. The system of claim 12, said first gateway is adapted to identify an address by looking up in a library a unique address corresponding to said receiving telephone number.

14. The system of claim 12, wherein, if a busy signal is received at the receiving gateway when a telephone connection is initiated to the second telephone device, said second gateway is adapted to provide a message so indicating to said first gateway, and said first gateway is adapted to provide a telephone busy signal to the first telephone device upon receipt of said message.

15. The system of claim 12, wherein the packet switched network is the Internet.

* * * * *